(12) United States Patent
Hanson et al.

(10) Patent No.: US 6,968,541 B1
(45) Date of Patent: Nov. 22, 2005

(54) APPARATUS AND METHOD FOR TEMPLATE INSTANTIATION WITH A CROSS COMPILER

(75) Inventors: Scott Patrick Hanson, Rochester, MN (US); Curtis P. Meier, Rochester, MN (US); Craig Arthur Orcutt, Mazeppa, MN (US); Robert Ralph Roediger, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 09/678,906

(22) Filed: Oct. 4, 2000

(51) Int. Cl.[7] .................................. G06F 9/45
(52) U.S. Cl. ............... 717/136; 717/106; 717/140; 717/162
(58) Field of Search ............... 717/106, 136, 717/140, 162

(56) References Cited

U.S. PATENT DOCUMENTS

| | | | |
|---|---|---|---|
| 5,836,014 A * | 11/1998 | Faiman, Jr. | 717/156 |
| 5,864,700 A * | 1/1999 | Barton et al. | 717/156 |
| 5,875,331 A * | 2/1999 | Lindsey | 717/108 |
| 5,946,493 A | 8/1999 | Hanson | 395/709 |
| 6,026,234 A | 2/2000 | Hanson et al. | 395/704 |
| 6,026,238 A * | 2/2000 | Bond et al. | 717/141 |
| 6,233,731 B1 * | 5/2001 | Bond et al. | 717/138 |
| 6,405,368 B1 * | 6/2002 | Freyburger | 717/140 |

OTHER PUBLICATIONS

Adamczyk, J. Stephen, Spicer, John H., "Template Instantiation in the EDG C++ Front End", 1995, retrieved from google.com, May 1, 2003.*
Adamides E.D., Bonvin, D., "Factory-Level Supervision Based on Reat-Time Cellular Object Architectures", p. 430-438, 1993.*
Volpano, Dennis M., Kieburtz, Richard B., "Software Templates", IEEE 1985, p. 55-60, retrieved from ACM Protal database May 1, 2003.*

* cited by examiner

Primary Examiner—Tuan Dam
Assistant Examiner—Mary Steelman
(74) Attorney, Agent, or Firm—Moser, Patterson & Sheridan, LLP (57) ABSTRACT

Automatic template instantiation for cross compilation is provided. More particularly, a routine (40) on a development computer system (10) extracts template information from source code (22). The routine (40) uses the template information to generate template source files (56, 56A, 56B), which may then be compiled with a cross compiler (20) to provide object code (54, 54A, 54B). Owing to one or more templates being dependent on one or more other templates, the routine is repeated until all templates, and their associated dependencies, are compiled into object code (54B) with the cross compiler (20). This object code is then portable from the development computer system (10) to a target computer system (60) for automatic template instantiation. Moreover, a template repository (52) is used to hold in part the template information. By centrally locating template information, duplicate templates may be avoided to conserve data resources.

26 Claims, 5 Drawing Sheets

APPARATUS AND METHOD FOR TEMPLATE INSTANTIATION WITH A CROSS COMPILER

BACKGROUND OF THE INVENTION

1. Field of the Invention

The invention relates to templates and, more particularly, the invention relates to template instantiation for cross compilers.

2. Background of the Related Art

Computer programs are conventionally written in a high-level language, such as C++. C++ is an object-oriented programming language in which programs are created using abstractions and constructs to create user-defined classes for defining the methods and variables for a particular type of object. All objects of a particular class are identical in form and behavior but contain different data on their variables.

The text of a computer program written in such a high-level language is called the source code. However, to more efficiently run a computer program, the computer program is conventionally converted from source code to machine language. A compiler is a computer program that converts or, more particularly, compiles source code into machine language. A compiled version of source code is called object code.

Many computer programs are written in modules, especially programs written by a team of developers. Accordingly, source code modules, after compilation, form object code modules. One or more of these modules may have one or more associated templates. Templates or parameterized types conventionally tell a compiler how to generate code at compile time. Templates may be likened to macros, as templates may be used to implement data structures or algorithms. The C++ language also provides templates, which define families of classes and functions that are structurally identical but contain different kinds of data in their variables or function parameters. A class template specifies how individual classes can be constructed. A function template specifies how individual functions can be constructed. Each family of classes and functions is specified by a template declaration, and each member of the family is called an instantiation. Instantiations are created by the compiler. During compilation, a compiler will track which templates are needed for a set of modules. The compiler will generate template code for those tracked templates. It should be understood that some templates depend upon other templates, which may depend upon still other templates, and so forth. Thus, instantiated templates may have one or more other template dependencies.

Object code modules are "linked" together by a computer program called a linker, to form an executable program. During "link" time, namely the time during which a group of modules is "linked" together, template object code is combined with other object code to provide template information associations for the executable program.

A template can have multiple template arguments. When a template is used, the actual types for the template arguments must be known. The compiler automatically generates implementations of the template by substituting the actual types for the template argument types. This is referred to as template instantiation. By automatic template instantiation, it is meant that a programmed computer is capable of extracting one or more templates from source code and creating template source code without human intervention. When the compiler detects that a template is being used, it instantiates a version of the template with the specified type arguments by making a copy of the definition of each required function with the actual template arguments substituted for the formal template arguments. The copy is compiled to produce object code that can then be passed to the linking step. To provide template instantiations, a compiler and a linker work together to ensure each template instantiation occurs only one time if it is needed in the executable program, and does not occur at all if it is not needed.

Advantageously, automatic instantiation of templates facilitates creation of an executable application without having to manually track template information and without having to manually instantiate templates.

Conventionally, a compiler compiles source code for operation on the same operating system platform that the compiler operates. For example, a compiler running on an OS/2 platform would compile for operation on that platform. However, a cross compiler generates target object code for a platform different from the one on which it operates. For example, a cross compiler may run on an IBM Think Pad with an OS/2 platform, but generate object code for execution on an IBM AS/400 computer running on an OS/400 platform. After generation of cross-compiled object code, the cross-compiled object code is moved to the target platform. A linker on the target platform links the object code to provide an executable program.

A C++ cross compiler from others works only on platforms with built-in linker support to collapse template instances. In other words, for cross-platform operation between different kinds of platforms a specialized linker designed to operate on the target platform must be used as opposed to a common platform linker. Moreover, because this C++ cross compiler uses the code equivalent of common blocks, compilation time is increased owing to repeated compiling of template code and duplicate templates.

A better approach to automatic template instantiation is creation of a template repository, namely an automatically maintained location where template instances are stored. In this approach, as individual object code files are built, a compiler places any template definitions and instantiations encountered into the repository. A link wrapper, which works with a common platform linker, adds in objects in the repository and compiles any needed instances not previously generated. Though this approach provides reduced compilation time over a common block approach, uses a standard system linker as opposed to a platform specific linker, and is more scalable over duplicate template generation, heretofore there has been no cross compiler solution implementing a template repository solution. By standard linker, it is meant a linker without template instantiation capability.

Therefore, a need exists in the art for a cross compiler with automatic template instantiation employing a template repository.

SUMMARY OF THE INVENTION

An aspect of the present invention is an apparatus comprising a processor in communication with memory and configured for use with an operating system of a first type and a computer program. The computer program comprises a cross compiler portion and a template instantiation portion. The template instantiation portion is configured to provide template source code. The cross compiler is configured to generate template object code from the template source code, and the template object code is configured for use on an operating system of a second type different from the first type.

Another aspect of the present invention is a method for automatic instantiation of templates for a cross compiler. Source code is disposed in a template repository. Template information files are extracted from the source code, and a list of the template information files is generated. Template source code is generated in response to the list. The cross compiler is used to generate machine executable code corresponding to the template source code. Accordingly, the machine executable code is operable on a target computer system.

Another aspect of the present invention is a program product comprising object code modules having at least one automatically instantiated template. The object code modules are cross-compiled from source code, and then at least a portion of the object code modules are disposed on machine-readable signal bearing media.

The above as well as additional aspects of the present invention will become apparent in the following detailed written description.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
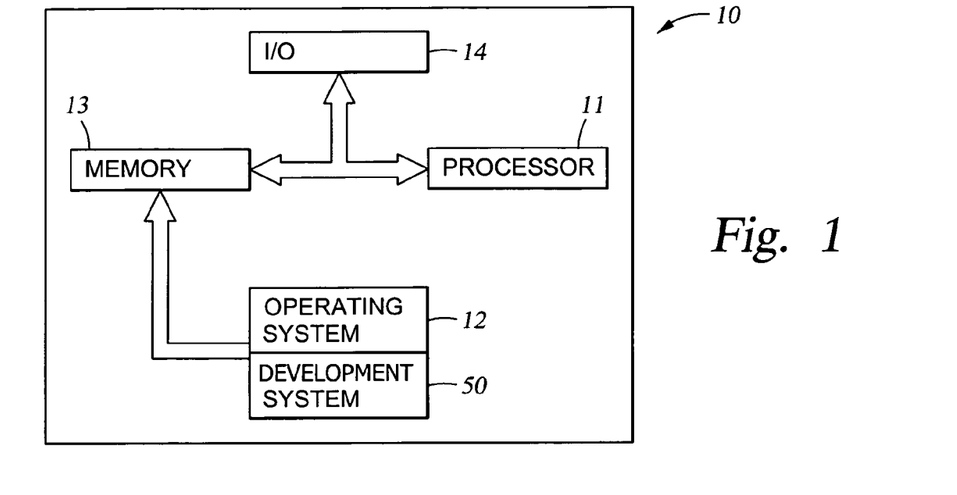
FIG. 1 is a block diagram depicting an exemplary portion of a computer system in accordance with an aspect of the present invention.

FIG. 1 is a block diagram of developer computer system 10. Computer system 10 may be implemented using a configured personal computer, workstation computer, mini computer, mainframe computer, or a distributed network of computers. For purposes of clarity, a personal computer system 10 is described hereinbelow though other computer systems may be used. Computer system 10 is configured with at least one of the following: processor 11, input/output interface 14, and memory 13. Computer system 10 comprises operating system 12, which may be OS/2, Java Virtual Machine, Linux, Solaris, Unix, Windows, Windows95, Windows98, Windows NT, and Windows2000, among other known platforms. Computer system 10 further comprises development system 50, described in more detail with reference to FIG. 5. At least a portion of operating system 12 and a portion of development system 50 may be disposed in memory 13. Memory 13 may include one or more of the following random access memory, read only memory, magneto-resistive read/write memory, optical read/write memory, cache memory, magnetic read/write memory, and the like.

Figure 6:
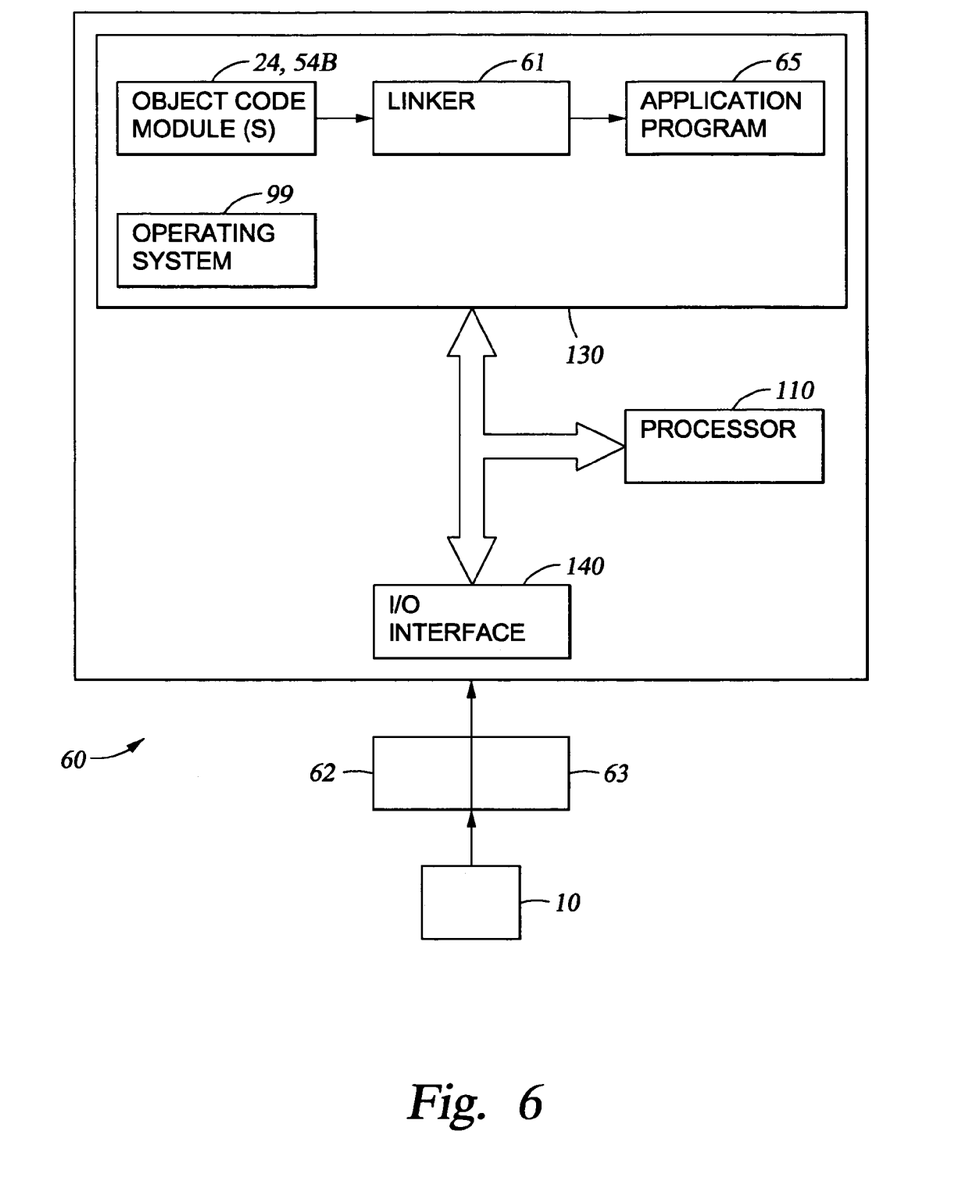
FIG. 6 is a block diagram depicting a target computer system in accordance with an aspect of the present invention.

As will be described in detail below, one embodiment of the invention is implemented as a program product for use with a computer system such as, for example, target computer system 60 shown in FIG. 6. The program(s) of the program product defines functions of the embodiments and can be contained on a variety of signal/bearing media, which include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

Figure 2:
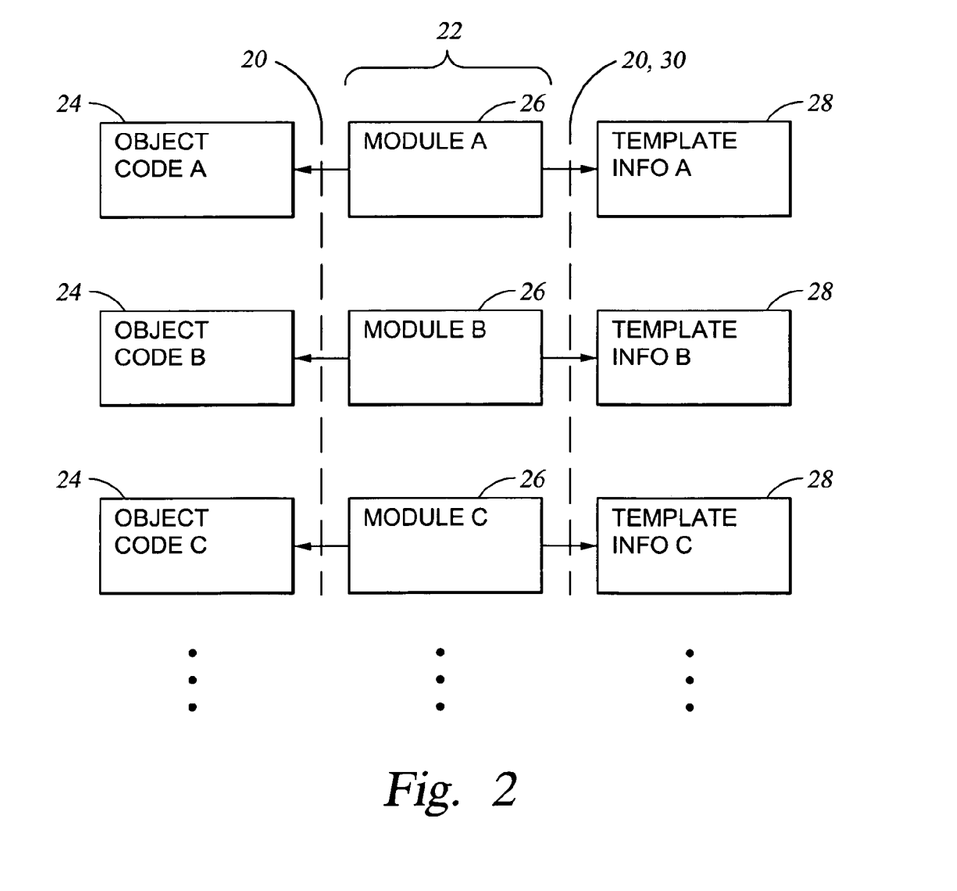
FIG. 2 is a process flow diagram depicting an exemplary portion of application code development in accordance with an aspect of the present invention.

Referring to FIG. 2, a process flow diagram for an exemplary portion of application code development in accordance with an aspect of the present invention is shown. Source code 22 comprises at least one source code module 26. Source code 22 may be developed on personal computer 10 or developed elsewhere and ported to computer system 10. By way of example and not limitation, source code 22 may be written in FORTRAN, Ada, Cobol, Modula-2, Pascal, Java, Visual Basic, C, C+, C++ or other programming languages that support parameterized types. Each source code module 26 is compiled by compiler 20 to produce an associated object code module 24.

Template information extraction routine 30 (shown in FIG. 3), which may be separate from or part of compiler 20, may be used to generate one or more template information files 28. Generally, template information files are files containing information for template instantiation. In the case of C++, for example, this information may relate to a class or a function.

Figure 3:
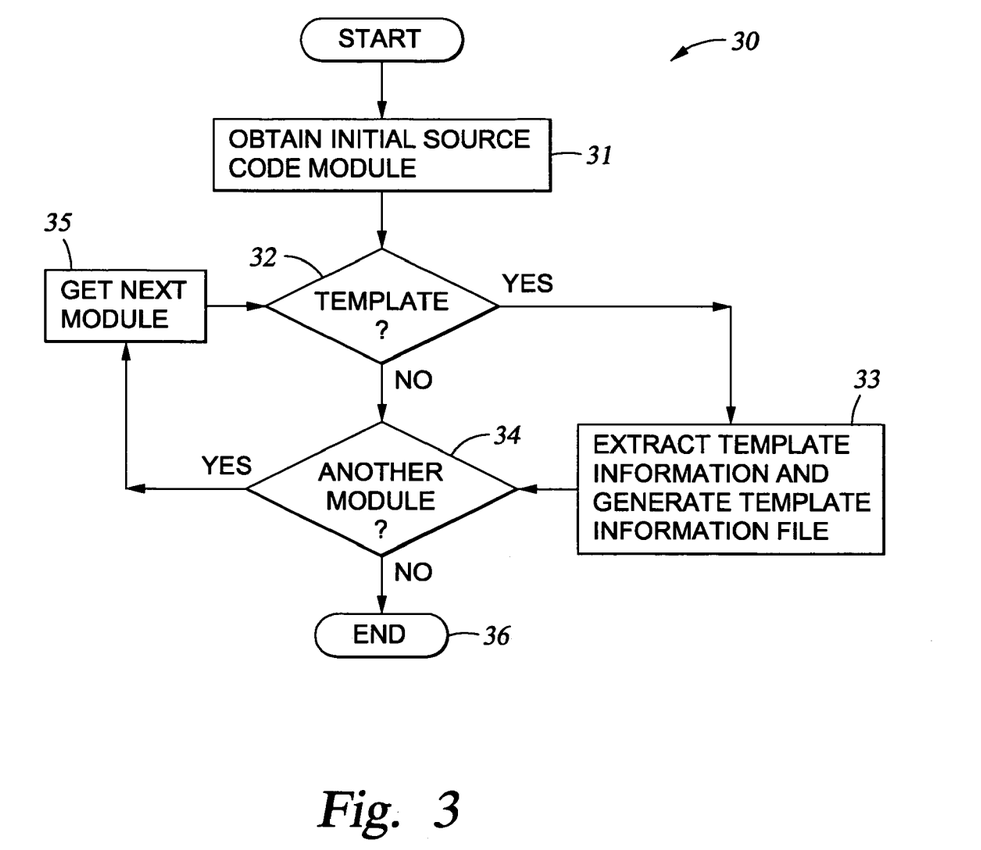
FIG. 3 is a flow diagram depicting a template information extraction routine in accordance with an aspect of the present invention.

In FIG. 3, a flow diagram of template information extraction routine 30 is shown in accordance with an aspect of the present invention. At step 31, an initial source code module 26 is obtained. At step 32, it is determined whether the initially obtained module uses a template. For example, module A may call for a STACK, which is a type of template. An illustrative type of a STACK is a last in first out (LIFO) order tabulation with a limited number of placeholders.

If at step 32 a module 26 uses one or more templates, then at step 33 template information, such as template type, algorithm, data structure, and the like, is extracted and a corresponding template information file 28 is created with this extracted information. To facilitate identification of template information files 28 for subsequent processing, a filename and predetermined extension is used. By way of example and not limitation, some sample filenames and their extension for template information files 28 are: moduleA.inst, moduleB.inst, and moduleC.inst. If at step 32 this module 26 does not make use of any template, then at step 34 a determination is made whether there are any more modules 26 to process.

If at step 34 another module 26 is to be processed, then at step 35 such other module 26 is obtained, and template information extraction continues at step 32. If no other module 26 is to be processed at step 34, routine 30 ends at step 36.

It will be apparent to those of skill in the art that template instantiation could begin prior to completion of compilation of all source code modules 26 to object code modules 24 and prior to completion of generation of all template information files 28. However, for clarity, template instantiation is described herein after completion of compilation of all source code files 26 to object code files 24 and after completion of generation of all template information files 28. Accordingly, the description that follows is based on completion of compilation; however, it applies equally to a partial compilation. Moreover, for purposes of clarity, the description that follows is premised on compiler 20 providing object code modules 24 and template information files 28 from source code modules 26, even though a program separate from compiler 20 may be used (e.g., routine 30).

Figure 5:
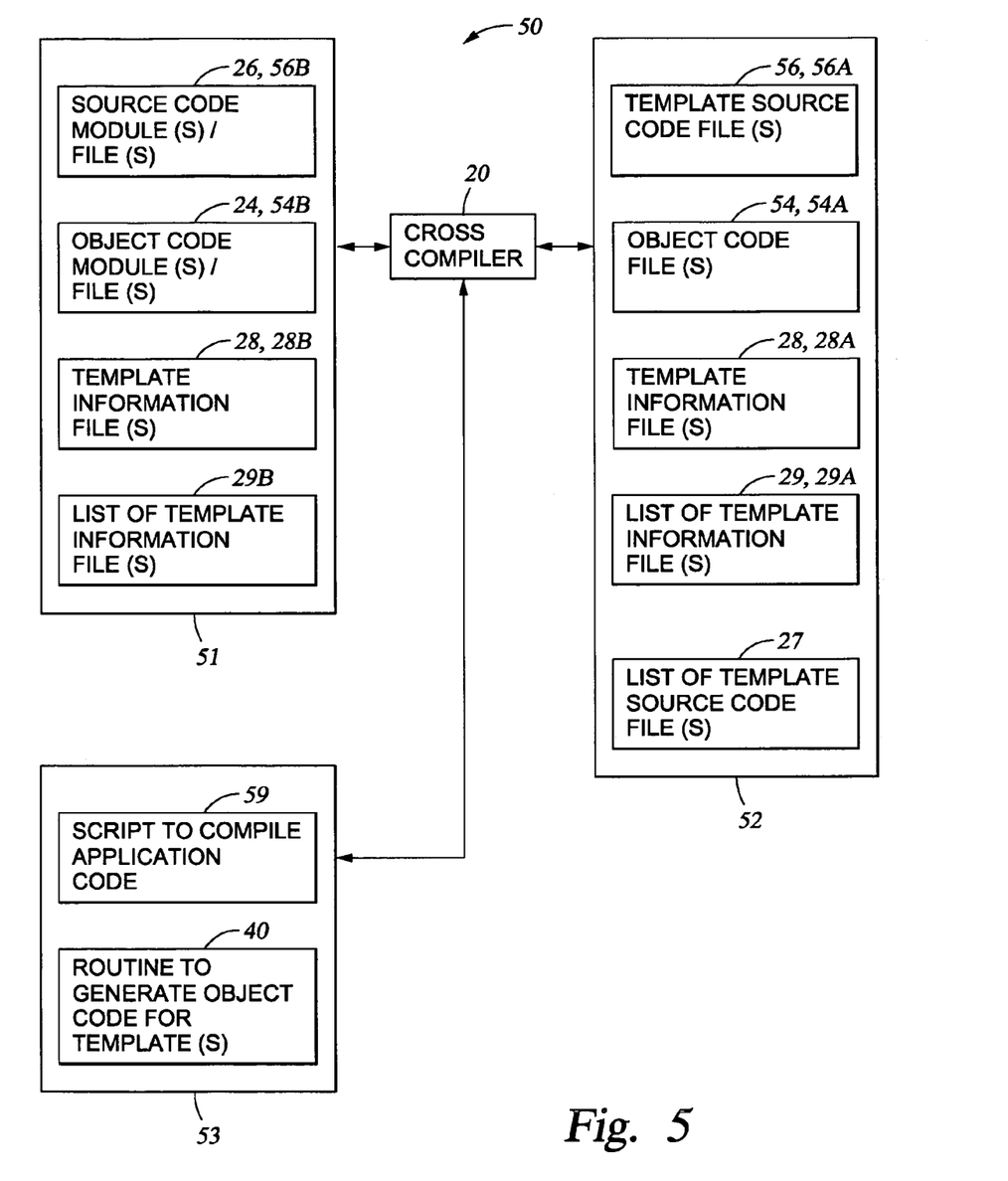
FIG. 5 is block diagram depicting a development system for the computer system of FIG. 1 in accordance with an aspect of the present invention.

Referring to FIG. 5, there is shown a block diagram of development system 50 in accordance with an aspect of the present invention. Development system 50 is a system for developing object code on computer system 10 (shown in FIG. 1) for transferring to a target computer system 60 (shown in FIG. 6). Development system 50 comprises application code 51, cross compiler 20, template repository 52, and application build tools 53. Application code 51, template repository 52 and application build tools 53 are operatively coupled to cross compiler 20. Application code 51 initially comprises source code modules 26. After interaction with compiler 20 and template repository 52, application code 51 receives object code modules 24 and 54B, and may receive template information files 28 and 28B, and a list of template information files 29B. Template repository 52 initially is empty until it receives template information files 28 from cross compiler 20, which in turn generates such template information files 28 in response to processing one or more source code modules 26. After processing template information files 28, template repository 52 may comprise template source code files 56 and 56A, template object code files 54 and 54A, template information files 28A, in addition to template information files 28, a list of template information files 29 or 29A, and a list of template source code files 27. Application build tools 53 comprises script 59 for compilation to produce application code and routine 40 to generate template object code.

Figure 4:
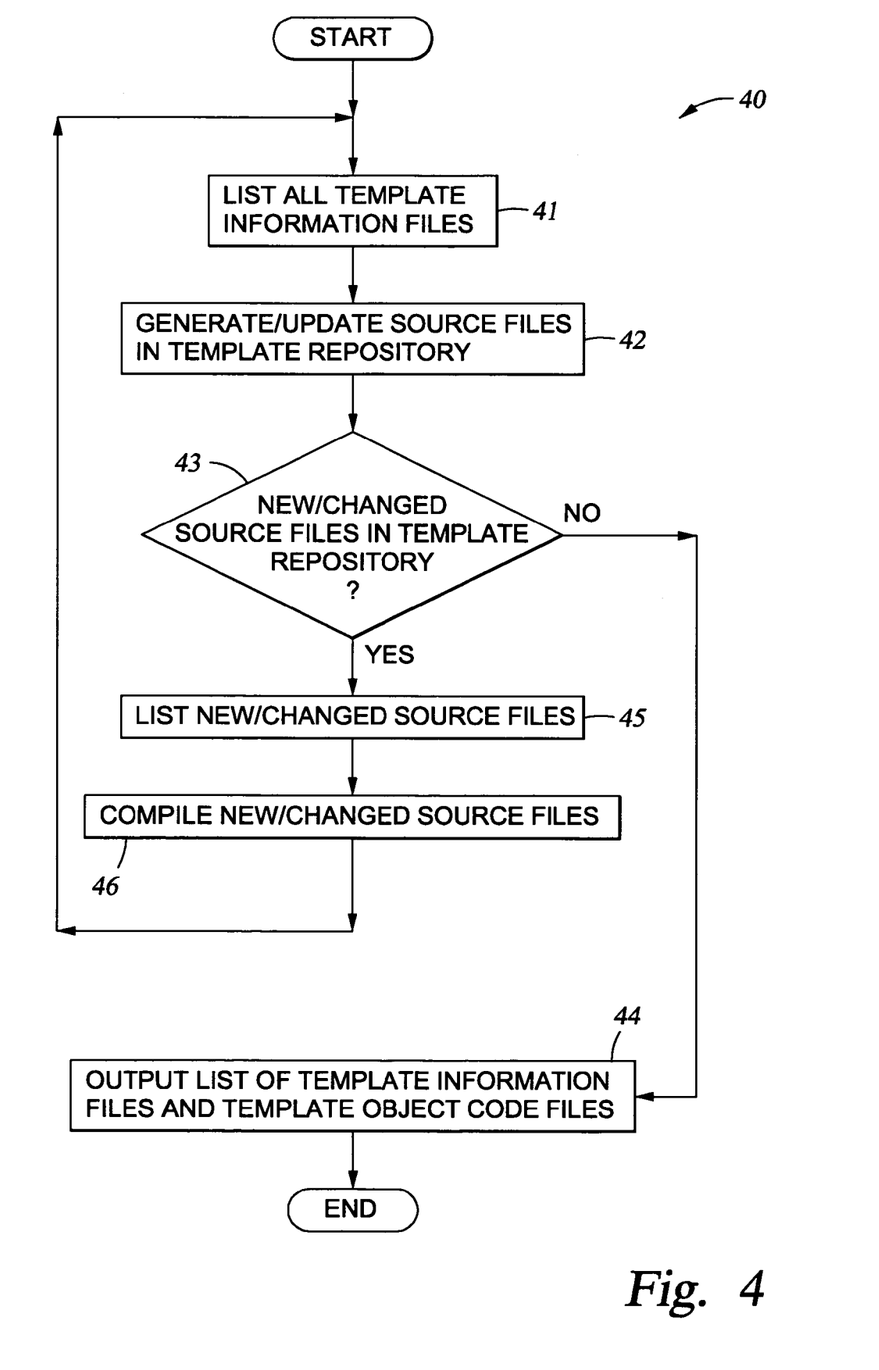
FIG. 4 is a flow diagram depicting a template instantiation program in accordance with an aspect of the present invention.

Referring to FIG. 4, there is shown a method 40 illustrating a template instantiation routine or program in accordance with an aspect of the present invention. Method 40 will be described with continuing reference to FIG. 4 and renewed reference to FIG. 5.

Source code modules 26 of application code 51 written by one or more developers are compiled by compiler 20 to object code modules 24 and template information files 28. A call to compiler 20 to perform compilation may be made from script 59 of application build tools 53. Script 59 is a set of instructions for compiler 20. Template information files 28 may be placed in template repository 52.

After receipt of template information files 28, template instantiation routine 40 is used to generate object code for template repository 52 as will now be described. At step 41, list 29 of all template information files 28 is generated. At step 42, template information files 28 contained in list 29 are accessed, and template information contained in those template information files 28 is used to generate template source code files 56. Notably, it is possible that no new template source code files 56 need be generated after an initial pass at step 42, because there are no templates or because none of the original templates associated with list 29 depend upon other templates. Thus, template source code in source code files 56 is not amended, and corresponding template object code files 54 are generated by compiler 20 from template source code files 56. However, assuming one or more template source code files 56A not initially present in source code files 56 are to be generated, cross compiler 20 may be called to perform generation of such template source code files 56A.

By way of example and not limitation, at step 42, it may be found that an originating template depends on another template, and thus to indicate this dependency, a newly created template source code file 56A is created. This newly created template source code file 56A may further depend on another template leading to creation of another template source code file 56A, and an update of a template source code file 56A associated with an originating template. Accordingly, it should be appreciated that dependency and interdependency of templates will lead to one or more iterations of routine 40.

At step 43, a determination is made as to whether any newly created or changed, template source code file 56A is within template repository 52. If there is no newly created or changed template source file 56A within template repository 52, then at step 44 a list 29B of any and all template information files 28 and 28A, corresponding to template source code files 56 and 56A, respectively, within template repository 52 may be outputted. Any and all outputted template information files 28 and 28A are indicated as template information files 28B, and any and all outputted template source files 56 and 56A are indicated as source code modules 56B. Template information files 28B may be outputted along with an associated version of object code files 54B. Files 54B may be provided to application code 51 for operational purposes along with files 56B and 28B for informational purposes.

If there is at least one newly created or changed template source code file 56A within template repository 52, template source code update list 27 is created at step 45. List 27 contains a listing of all template source code files 56 and 56A.

At step 46, any and all newly created and updated template source code files 56 and 56A are compiled to provide associated object code files 54 and 54A, respectively. This compilation is done by cross compiler 20 in response to list 27. A call to compiler 20 may be made by routine 40 of application build tools 53. Additionally, compiler 20 may provide template information files 28 and 28A corresponding to this most recent compilation.

After step 46, an updated list 29A of all template information files, namely template information files 28 and 28A, is generated at step 41. As mentioned above, one template may depend on another template and so on and so forth. Thus, additional template instantiations may be done due to a template relying on one or more other templates. Accordingly, steps 41 through 43 and 45 through 46 are repeated until there are no additional or changed template instantiations.

Eventually, all required template instantiations are performed and no additional iterations are done as determined at step 43. At this point, automatic template instantiation has been achieved for a cross compiler development environment and associated object code is ready to be transported. It should be understood that by instantiating templates on a development computing system and not on a target computing system, no special linker support is needed, namely, such a linker on a target computing system need not be configured to further instantiate templates, or more particularly, to collapse template instances.

Development system 50 resides on computer system 10, and thus object code modules 24, 54B, associated with source code modules 26, 56B having automatically instantiated templates, may be transferred to a target computing system. In general, the target computing system may be any computer system configured to link the object code. An illustrative target computer system 60 is shown in FIG. 6.

Target computer system 60 comprises memory 130, processor 110 and I/O interface 140. Target computer system 60 is programmed with operating system 99, which is not the same kind as operating system 12 of computer system 10 (shown in FIG. 1). Computer system 60 may be implemented using a configured personal computer, workstation computer, mini computer, mainframe computer, or a distributed network of computers programmed with an operating system 99 selected from OS/2, Java Virtual Machine, Linux, Solaris, Unix, Windows, Windows95, Windows98, Windows NT, and Windows2000, among other known platforms, excluding the same type of operating system used by computer system 10 (shown in FIG. 1).

Linker 61 on target computing system 60 links object code modules 24 and 54B to create application program 65. At least a portion of object code modules 24 and 54B may be moved from computer system 10 to target computing system 60 via transmission medium 63. Examples of transmission medium 63 include, but are not limited to, cable, DSL, telephonic, Internet backbone, satellite, cellular, LAN, WAN, and the like. At least a portion of object code modules 24 and 54B may be moved from computer system 10 to target computing system 60 via storage media 62. Examples of storage media 62 include, but are not limited to, a floppy disc, zip disc, CD, memory card, and the like. Application program 65 may be transported from target computing system 60 using machine-readable signal bearing media 62 or 63.

Embodiments of the present invention are especially useful in creating application programs with multiple templates, as templates are automatically instantiated. It should be appreciated that no special system linker support is needed, rather a standard linker for a target system may be used. Additionally, because templates are instantiated iteratively in accordance with a repository approach, duplicate templates may be avoided. This is especially important for enterprise scaling, where avoidance of duplicate templates substantially reduces system overhead, and thus embodiments of the present invention facilitate more efficient use of development resources.

Although various embodiments which incorporate the teachings of the present invention have been shown and described in detail herein, those skilled in the art can readily devise many other varied embodiments that still incorporate these teachings.

AS/400 and OS/2 are trademarks of International Business Machines Corporation. All other trademarks are the property of their respective owners.

While the foregoing is directed to the preferred embodiment of the present invention, other and further embodiments of the invention may be devised without departing from the basic scope thereof, and the scope thereof is determined by the claims that follow.

What is claimed is:

1. An apparatus configured for automatic instantiation of templates comprising:
   a processor;
   memory in communication with the processor;
   a first operating system residing in the memory and executable by the processor;
   a set of source code modules containing source code; and
   at least one computer program, the at least one computer program comprising
   (i) a template instantiation portion configured to generate template source code for each occurrence of a template appearing in the set of source code modules, and further configured to store a template information file in a repository for each such occurrence, and
   (ii) a cross compiler portion configured to generate template object code modules from the template source code, wherein the template object code modules are configured for linking an object code module on a second operating system different from the first operating system.

2. The apparatus of claim 1, wherein the cross compiler portion is a separate computer program from the template instantiation portion.

3. The apparatus of claim 1, wherein the first operating system is selected from OS/2, Linux, Unix, Solaris, Java Virtual Machine, Windows2000, Windows NT, Windows95, and Windows98.

4. The apparatus of claim 1, wherein the cross compiler is configured to compile a programming language selected from Pascal, Cobol, FORTRAN, Ada, Java, C+, and C++.

5. A method for automatic instantiation of templates for a cross compiler, comprising:
   providing source code;
   extracting template information from the source code;
   providing the template information to a template repository;
   generating template source code in response to information from the template information; and
   using the cross compiler to generate a first template object code from the template source code; and
   wherein the first template object code is configured for linking with object code modules on a target computer system having a linker.

6. The method of claim 5, further comprising:
   amending the template source code in response to template dependency on another template; and
   generating a list of the template source code as amended.

7. The method of claim 6, further comprising:
   using the cross compiler to generate second template object code by compiling the template source code, as amended.

8. The method of claim 7, wherein the amending of the template source code comprises identifying at least one addition or change to the template source code within the template repository.

9. The method of claim 8, further comprising linking the second template object code and other object code using the linker on the target computer system to provide machine executable code operable on the target computer system.

10. A method for automatic instantiation of templates from source code for use with a cross compiler residing on an origination computer system, comprising:
  providing a template repository in communication with the cross compiler;
  providing source code modules;
  generating at least one template information file from the source code modules using the cross compiler;
  providing the at least one template information file to the template repository;
  generating at least one template source code module from the at least one template information file; and
  generating object code modules from the source code modules and the at least one template source code module using the cross compiler,
  wherein the object code modules are linkable on a target computer system having an operating system different in kind than that of the origination computer system.

11. The method of claim 10, further comprising amending the source code modules with the at least one template source code module associated with the at least one template information file.

12. The method of claim 11, further comprising providing the object code modules to the target computer system, wherein the target computer system includes a linker configured to link the object code modules.

13. The method of claim 12, wherein the linker is not configured to instantiate a template.

14. The method of claim 13, further comprising generating at least one more template information file corresponding to the template source code module.

15. The method of claim 14, further comprising generating another template information file list associated with both the at least one template information file and the at least one more template information file.

16. The method of claim 12, further comprising:
  generating a template information file list associated with the at least one template information file; and
  generating a list of the at least one template source code module.

17. A system for cross compilation with automatic template instantiation, comprising:
  a first computer under control of a first operating system, the first computer comprising:
  source code modules;
  a cross compiler configured to generate object code modules and template information files from the source code modules;
  a template repository configured to receive the template information files; and
  a program configured to:
  generate a list of the template information files, template source code modules, and a list of template source code modules, the program further configured to locate the list of the template information files, the template source code modules and the list of template source code modules in the template repository, the program further configured to employ the cross compiler to generate template object code modules from the template source code modules, wherein the template object code modules are linkable with object code modules on a second computer under control of a second operating system.

18. The system of claim 16 further comprising:
  the second computer programmed with the second operating system different in kind from the first operating system, the second computer in communication with the first computer to receive the template object code modules.

19. The system of claim 18, wherein the template object code modules are provided to the second computer using a machine-readable tangible medium.

20. The system of claim 19, wherein the machine-readable medium is a tangible medium comprising a computer network connection between the first and second computer.

21. The system of claim 19, wherein the machine-readable storage medium is a storage medium.

22. A storage medium containing a program which, when executed by a processor in response to receiving template information, from a repository of template information, causes execution of a method comprising:
  generating template source code in response to the template information; and
  invoking a cross compiler to generate a first template object code corresponding to the template source code;
  wherein the first template object code is linkable, with a set of object code modules generated from source code modules, on a target computer system having a linker without template instantiation support.

23. The storage medium of claim 22, further comprising:
  amending the template source code in response to template dependency on another template; and
  generating a list of the template source code as amended.

24. The storage medium of claim 23, further comprising:
  compiling the template source code as amended into second template object code.

25. The storage medium of claim 24, wherein the amending of the template source code comprises identifying at least one addition or change to the template source code within the template repository.

26. The storage medium of claim 25, further comprising linking the second template object code with the linker to provide machine executable code operable on the target computer system.

* * * * *